Feb. 22, 1966   R. G. BENFIELD   3,236,100
LIQUID LEVEL GAUGES

Filed April 17, 1964   3 Sheets-Sheet 1

United States Patent Office 3,236,100
Patented Feb. 22, 1966

3,236,100
LIQUID LEVEL GAUGES
Ronald Geoffrey Benfield, Hextable, Kent, England, assignor to Richard Klinger Limited, Sidcup, Kent, England, a company of Great Britain and Northern Ireland
Filed Apr. 17, 1964, Ser. No. 360,570
Claims priority, application Great Britain, Apr. 18, 1963, 15,315/63
6 Claims. (Cl. 73—330)

This invention relates to improvements in liquid level gauges, and specifically to gauges of the "through vision" and "reflex" types which are capable of withstanding high internal pressures. Such gauges are used to indicate liquid level, for example, the water level in steam boilers, the level of oil in storage vessels, or the level of any liquid under pressure or vacuum in its containing vessel. The gauges are connected to the vessel in such a manner that the whole behaves as a manometer.

The conventional form of construction of such gauges is illustrated in FIGURES 1 and 2 showing the "through vision" and "reflex" type respectively.

The "through vision" type consists of two light transmitting members $a$ which are separated by a centre-piece $b$. The centre-piece $b$ has an opening or openings in the way of the light transmitting members to permit "through vision," and in addition has further openings in each end to permit the transmission of fluid. Thus, the centre-piece $b$ together with the light transmitting members $a$ form a fluid chamber with openings in the top and the bottom. In some way, the chamber is made pressure-tight by sealing the joining faces between the light transmitting members $a$ and the centre-piece $b$, usually by the insertion of gaskets $c$ and the application of compressive load to the light transmitting members $a$ which in turn provide the required sealing pressure on the gaskets $c$.

The typical construction of a "reflex" gauge (FIGURE 2), is similar, but only one light transmitting member $a$ is used, having prismatic grooves on the fluid side. The centre-piece $b$ is merely hollowed out, so that it is open only immediately behind the light transmitting member and at the ends.

The detailed design and construction of such gauges has hitherto presented difficulty in that the sides of the centre-piece tend to bow outwards under the fluid pressure. This has been overcome by increasing the strength of the centre-piece, or by providing the clamping load in the form of some massive construction which contributes towards strength in direction other than that of the applied clamping load, or by both strengthening the centre-piece and providing massive construction for clamping.

It is generally intended that the clamping load should be applied perpendicularly to the face of the light transmitting members. In all cases further difficulty is encountered in providing the clamping load on the light transmitting member or members in such a way as to avoid breaking it or them as a result of excessive or uneven compression. Most frequently the light transmitting members are made of glass, but mica is also used, in which case it is usually supported either by glass or by louvred metal.

It will be appreciated that there is merit in a design of such a gauge in which the ability to withstand pressure can be achieved more positively, more simply, in a lighter construction, and more safely within the strength of the glass or light transmitting member. It is an object of the present invention to design a liquid level gauge in which some or all of these features are partially or wholly improved.

According to the present invention there is provide a liquid level gauge having a centre-piece provided with a fluid chamber constructed to withstand lateral stresses due to the pressure of the contained fluid, light transmitting members covering the said fluid chamber and clamping members for sealing the light transmitting members to the centre-piece, the clamping load being applied between the light transmitting members and the centre-piece in such a way that the edge stresses in the light transmitting members are reduced and the tensile component of stresses within the light transmitting members are also reduced.

Thus, the arrangements for clamping need only withstand stress in the direction of clamping and do not have to be of such massive construction in order that they contribute to the strength in other planes. Accordingly, the clamping is provided by means of rows of bolts or studs applying load through light clamping members on each side of the light transmitting members, furthermore this clamping load is provided in such a manner that there is less danger of breaking or failure of light transmitting member during either assembly or service as a result of excessive or uneven stress.

The present invention will now be described in greater detail by way of examples with reference to FIGURES 3 to 9 of the accompanying drawings, wherein.

Figures 1, 2:
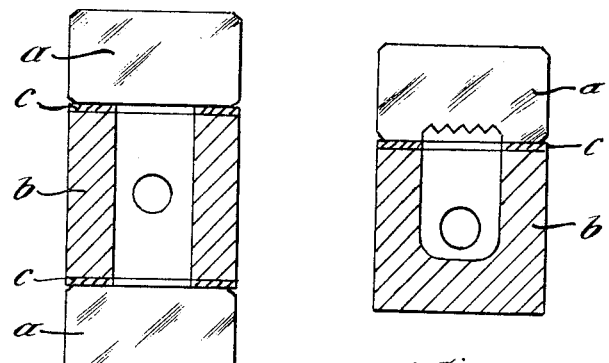
FIG. 1 is a cross sectional view showing a conventional "through vision" type of gauge.
FIG. 2 is a cross sectional view showing a conventional "reflex" type of gauge.
Figure 3:
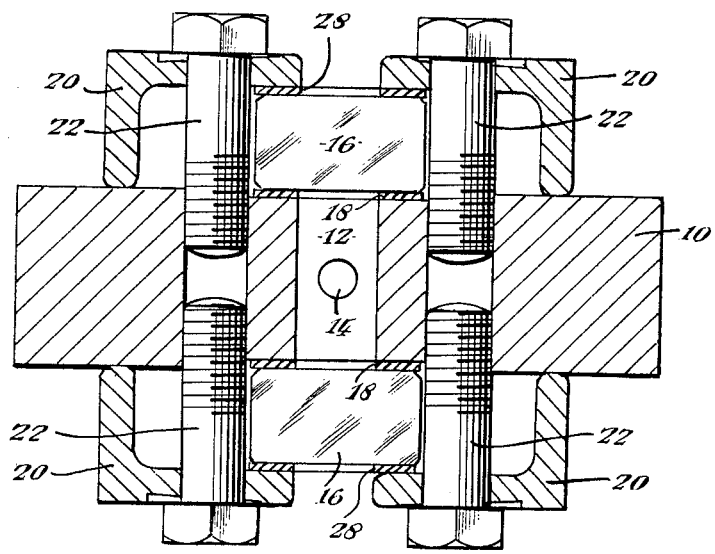
FIGURE 3 is a cross-sectional plan view of one embodiment of a "through vision" type of liquid level gauge.
Figure 5:
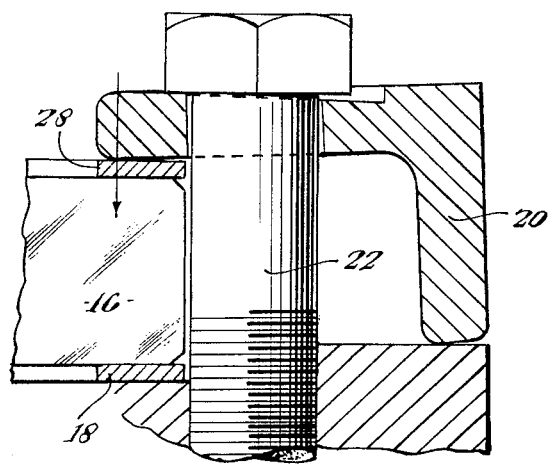
FIGURE 5 illustrates a portion of FIGURES 3 and 4 in greater detail.
Figure 7:
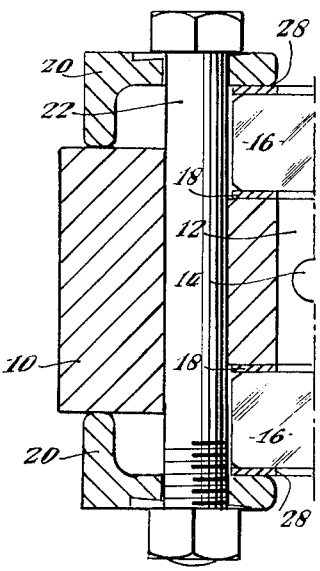
FIGURES 6, 7, 8 and 9 are part cross-sectional plan views of further embodiments of liquid level gauges.
Figure 6:
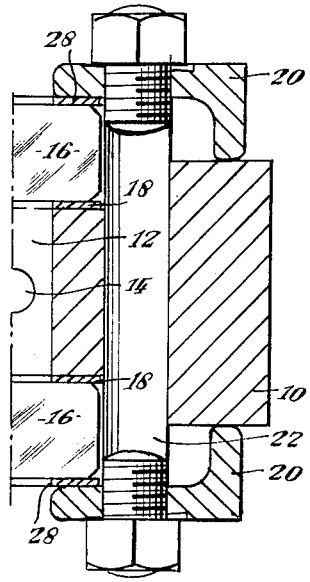
Figure 8:
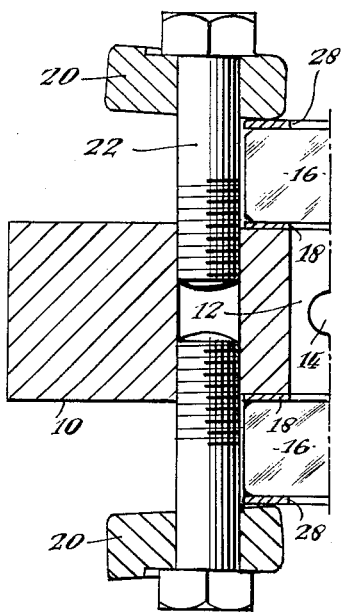
Figure 9:
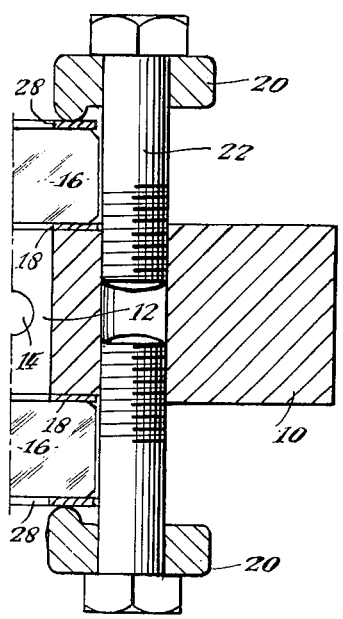

Referring first to FIGURE 3, the gauge comprises a centre-piece 10, having a fluid chamber 12 and connecting passages 14 at each end. The connecting passages 14 are shown to be co-axial with the gauge but they may be offset or placed in the side, front or back of the centre-piece 10. The faces of the centre-piece 10 may be recessed to accommodate the transparent members 16 as shown in FIGURES 6 and 7. The dimensions of the section of the centre-piece 10 are such that its modulus is designed to withstand the intended internal fluid pressure within the limitations of thickness, being the minimum to accommodate the end connections, and deflection, which is translated into lateral movement between centre-piece 10 and light transmitting members 16. The light transmitting members 16, which may be made of glass, are located on each face of the centre-piece 10 to cover the fluid chamber 12. Sealing gaskets 18 prevent leakage between the centre-piece 10 and the light transmitting members 16. The light transmitting members 16 are pressed towards the centre-piece 10 by means of light clamping members 20. Soft cushioning gaskets 28 are placed between the clamping members 20 and the light transmitting members 16 to absorb and redistribute localised stress concentrations which might result from dimensional inaccuracies in the finish of the clamping members 20 and the light transmitting members 16. The light clamping members 20 are positioned adjacent to each other on either side of the light transmitting member 16. Adjacent clamping members 20 are not rigidly fixed together but may be loosely connected to facilitate ease of handling. The light clamping members 20 may either be provided in continuous lengths or may be discontinuous and provided as washers or lugs. The light clamping members 20 may be of flat or shaped section (FIGURES 3, 6, 7, 8 and 9). The light clamping members 20 are pressed towards the centre-piece 10 by means of the screwed fixing 22 which may be provided as screws (FIGURE 3) studs (FIGURE 6) or bolts (FIGURE 7). The pitch of the screwed fixings 22 and the span of the clamping members 20 is fixed in relation to the rigidity of the clamping members 20 and the compressive load which they must apply in order to seal the contained fluid, whilst at the same time avoiding excessive localised stress concentrations in the light transmitting members 16. The face of the clamping member 20 immediately under the nut or bolt head is machined at an angle, as shown in FIGURE 5, so that when tightened the front edge of the clamping member 20 tends to tilt forward and bear down upon the light transmitting member 16, thus the compressive load is transmitted by this edge and is directed at or near the perpendicular to the face and along a line removed from the edge of the light transmitting member 16. Machining the face of the clamping member 20 in this way does produce a bending stress in the screws 22 but this is low and within their strength.

Figure 4:
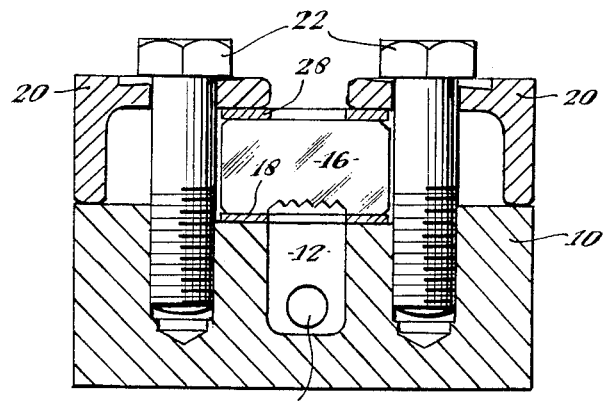
FIGURE 4 is a cross-sectional plan view of a second embodiment of a "reflex" type of liquid level gauge.

FIGURE 4 is a cross-sectional plan view of a second embodiment of a liquid level gauge, of the "reflex" type, the construction of which is similar to that of the "through vision" type illustrated in FIGURE 3 and described above.

It will be appreciated from the above described examples that the cross-sectional shape and dimensions of the centre-piece are such that the arrangements for clamping need not provide strength other than in the direction perpendicular to the face of the transparent or light transmitting members. The application of the load of bolts or studs through the clamping members and the soft cushion gaskets provides for an adequate distribution of compressive load along the length of the light transmitting member, without creating excessive stress concentration which might otherwise occur as a result of dimensional inaccuracies of the surface.

The compressive stress is applied independently to each side of the light transmitting member, thus reducing the possibility of torsion stress which might otherwise be set up if the two clamping members were rigidly joined together in the form of a cover with vision aperture. Furthermore, the stress is applied in such a manner that it tends to remain perpendicular to the light transmitting member, thus reducing the possibility of bending stresses which may otherwise be set up when the load is applied out of perpendicular.

The position at which the load is applied to the light transmitting member is such that the load is not placed on its edge, which is much weaker than its body.

In the constructions illustrated in FIGURES 3 to 8, the clamping load is applied well away from the edges of the light transmitting members by providing the faces of the clamping member immediatetly under the bolt or nut heads with a machined away area so that when tightened the front edge of the clamping member tends to tilt forward thus avoiding undue edge stress in the light transmitting member. In the construction illustrated in FIGURE 9, this same feature is achieved by providing the face of the clamping member which makes contact with the light transmitting member with a semicylindrical surface so that when tightened the load is always applied well away from the edges of the light transmitting members by means of the rolling edge, thus inhibiting the generation of bending stress at the edges thereof.

These features are of special significance when the light transmitting members are made of glass as this material has high compressive strength but very low tensile strength. Furthermore, the edges of the glasses will not withstand such high loading as the main body.

What I claim and desire to secure by Letters Patent is:

1. A liquid level gauge having a centre-piece provided with a fluid chamber constructed to withstand lateral stresses due to the pressure of the contained fluid, rigid light transmitting members covering the said fluid chamber, clamping members extending the length of the centre-piece for sealing the light transmitting members thereto, a plurality of bolts for clamping the clamping members so as to seal the light transmitting members, said clamping members having their faces immediately under the bolts machined at an angle so that the clamping load which is applied between the light transmitting members and the centre-piece is such that edge stresses in the light transmitting members are reduced and the tensile component of stresses within the light transmitting members are also reduced.

2. A liquid level gauge according to claim 1, wherein the clamping members on either side of each light transmitting member are not rigidly joined and thus inhibit the generation of torsional stresses within the light transmitting member.

3. A liquid level gauge according to claim 1, wherein the centre-piece is provided with a recess at opposite sides thereof into which a pair of light transmitting members fit, the ends of the recess on each side being closed.

4. A liquid level gauge having a centre-piece provided with a fluid chamber constructed to withstand lateral stresses due to the pressure of the contained fluid, a rigid light transmitting member covering said fluid chamber, a pair of clamping members for sealing the light transmitting member on either side thereof to the centre-piece, a plurality of equi-spaced bolts along the length of each clamping member for securing the light transmitting member to the centre-piece in fluid tight manner, said clamping members having their faces immediately under the bolts machined at an angle so that the clamping load which is applied between the light transmitting members and the centre-piece is such that edge stresses in the light transmitting member are reduced and the tensile component of stresses within the light transmitting member are also reduced.

5. A liquid level gauge having a centre-piece bounding a fluid chamber constructed to withstand lateral stresses due to the pressure of the contained fluid, rigid light transmitting members covering the fluid chamber, a plurality of separate clamping members for sealing the light transmitting members to the centre-piece, a bolt for each clamping member so as to seal the light transmitting members, said clamping members having their faces immediately under the bolts machined at an angle so that the clamping load which is applied between the light transmitting members and the centre-piece is such that edge stresses in the light transmitting member are reduced and the tensile component of stresses within the light transimtting member are also reduced.

6. A liquid level gauge having, in combination, a centre-piece having a fluid chamber therein and at least one open side and bolt receiving means, a rigid light transmitting member covering the open side of the fluid chamber, clamping members having bolt receiving apertures therein and an engaging portion for pressing against and sealing the light transmitting member to the centre-piece, a plurality of bolts for clamping the clamping members so as to seal the light transmitting member, said clamping members having their faces immediately under the bolts machined at an angle so that said engaging portion on the clamping member engages the light transmitting member spaced in from the edge of the light transmitting member such that the edge stresses in the light transmitting member are reduced and the tensile component of stress within the light transmitting member is also reduced.

(References on following page)

References Cited by the Examiner

UNITED STATES PATENTS

| | | | |
|---|---|---|---|
| 608,697 | 8/1898 | Moore et al. | 269—229 X |
| 1,463,409 | 7/1923 | Theiss | 85—50 X |
| 1,854,277 | 4/1932 | Schatz | 85—50 |
| 2,065,646 | 12/1936 | Brown | 73—329 |
| 2,201,542 | 5/1940 | Kinderman | 73—330 |
| 2,523,760 | 9/1950 | Hayner | 292—256.75 |
| 2,582,816 | 1/1952 | Bonnell | 85—50 X |
| 2,760,299 | 8/1956 | Gable et al. | 45—131 |

FOREIGN PATENTS 424,013   2/1935   Great Britain.

ROBERT B. HULL, *Primary Examiner.*

ISAAC LISANN, *Examiner.*

H. N. HAROIAN, *Assistant Examiner.*